United States Patent Office 3,002,026
Patented Sept. 26, 1961

3,002,026
PREPARATION OF BENZYL DECABORANES
Robert J. Palchak, Tonawanda, N.Y., assignor to Olin Mathieson Chemical Corporation, a corporation of Virginia
No Drawing. Filed Aug. 19, 1958, Ser. No. 757,175
7 Claims. (Cl. 260—606.5)

This invention relates to the preparation of benzyl decaborane ($C_6H_5CH_2B_{10}H_{13}$) and dibenzyl decaboranes (($C_6H_5CH_2)_2B_{10}H_{12}$).

Benzyl decaborane can be prepared by the direct reaction of a benzyl halide, such as benzyl chloride, benzyl bromide or benzyl iodide, and a compound of the class $B_{10}H_{13}M$ wherein M is an alkali metal, such as lithium, sodium or potassium, for example, decaboranyl sodium. Thus, when the benzyl halide is benzyl bromide and $B_{10}H_{13}M$ is decaboranyl sodium, the reaction can be expressed by the following equation:

$$C_6H_5CH_2Br + B_{10}H_{13}Na \rightarrow C_6H_5CH_2B_{10}H_{13} + NaBr$$

The reaction between the benzyl halide and $B_{10}H_{13}M$, wherein M has the significance previously given, is preferably conducted at a temperature within the range from 25° C. to 100° C. while the reactants are admixed with a solvent which is inert under the reaction conditions, for example, diethyl ether.

Benzyl decaborane, $C_7H_{20}B_{10}$, is a colorless crystalline solid with a melting point of 63.5° to 64.5° C. A mass spectrographic analysis shows a cut off peak at 214. Benzyl decaborane contains 39.56 percent carbon, 9.49 percent hydrogen and 50.93 percent boron. The infra red spectrum is characteristic of an alkylated decaborane. The compound, benzyl decaborane, is soluble in the usual organic solvents especially pentane and the ethers.

Dibenzyl decaboranes can be prepared by the direct reaction of a benzyl halide, such as benzyl chloride, benzyl bromide or benzyl iodide, and a compound of the class $C_6H_5CH_2B_{10}H_{12}M$, wherein M is an alkali metal, such as lithium, sodium or potassium, for example, benzyl decaboranyl sodium. Thus, when the benzyl halide is benzyl bromide and $C_6H_5CH_2B_{10}H_{12}M$ is benzyl decaboranyl sodium, the reaction can be expressed by the following equation:

$$C_6H_5CH_2Br + C_6H_5CH_2B_{10}H_{12}Na \rightarrow (C_6H_5CH_2)B_{10}H_{12} + NaBr$$

Here again the reaction between the benzyl halide and $C_6H_5CH_2B_{10}H_{12}M$, wherein M has the significance previously given, is preferably conducted at a temperature within the range from 25° C. to 100° C. while the reactants are admixed with a solvent which is inert under the reaction conditions, for example, diethyl ether.

Mixed isomers of dibenzyldecaborane produced in accordance with this invention have a melting point of 111° C.–116° C.

Benzyl decaborane and dibenzyl decaborane can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. Benzyl decaborane and dibenzyl decaborane, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following examples illustrate the invention, but are not to be considered limiting.

*Example I*

The reaction was performed in a one-liter round bottom flask. A slow stream of nitrogen was maintained over the reactants since decaboranyl sodium is subject to air oxidation.

In this example, 51.6 grams (0.3 mole) of benzyl bromide was added rapidly to a solution of decaboranyl sodium prepared from 36.6 grams (0.3 mole) of decaborane and 15 grams of a 50 weight percent dispersion of sodium hydride in mineral oil. Approximately 300 ml. of anhydrous diethyl ether were then added to the mixture as a solvent. The mixture remained at room temperature, 20° C., for 18 hours during which time its color changed from yellow to orange. It was warmed in a 50° C. water bath for 5 hours and then diluted with approximately 300 ml. of ether and filtered through a sintered glass funnel to remove the sodium bromide formed. The orange filtrate was concentrated, at a reduced pressure of approximately 15 mm. of mercury absolute, to yield a viscous orange liquid. This liquid was extracted 5 times with approximately 100 ml. of normal pentane each time to recover the benzyl decaborane. The pentane was removed from the combined extracts by vacuum to yield 56.3 grams of a mobile orange liquid.

The mobile orange liquid (42 grams) was distilled at a pot temperature of approximately 150° to 180° C. at a pressure of $10^{-1}$ to $10^{-3}$ mm. of mercury absolute to yield 24 grams of a yellow liquid which solidified at room temperature. By recrystallizations from n-pentane, 13 gm. of benzyl decaborane of the formula $B_{10}H_{13}CH_2C_6H_5$ was recovered from the 24 grams of yellow liquid, together with 10 grams of decaborane.

The 15.6 grams of residue was distilled in a molecular still. A mass spectrographic analysis of the 1.6 grams of distillate obtained showed that the material was mainly benzyl decaborane with a small amount of dibenzyl decaborane. A carbonaceous residue, 11.0 grams, was also obtained.

*Example II*

This example was conducted using the identical weights of reactants and the same procedure described in Example I.

The viscous orange liquid obtained after the removal of the sodium bromide was concentrated at a reduced pressure, then washed 5 times with approximately 100 ml. portions of normal pentane to extract the benzyl decaborane. The pentane was removed from the combined extracts by vacuum and a mobile orange liquid was obtained. A mass spectrometric analysis of this liquid showed that it contained 58 parts decaborane, 41 parts benzyl decaborane and 0.4 part dibenzyl decaborane by weight. Nine grams of decaborane were recovered from the liquid by vacuum sublimation.

The remaining liquid was distilled at approximately 150° C. to 180° C. and a pressure of $10^{-1}$ to $10^{3-}$ mm. of mercury absolute to yield a pale yellow liquid which solidified at room temperature. Recrystallization from normal pentane gave 13 grams of colorless $$B_{10}H_{13}CH_2C_6H_5$$

crystals melting at 63.5° to 64.5° C. This corresponds to a 33.5 percent corrected yield of benzyl decaborane. The infrared spectrum of these crystals was characteristic of an alkylated decaborane. The mass spectrophometric analysis showed a cut off peak at 214. An elemental analysis of the crystals showed that they contained 39.4

(39.0, 39.9, 39.2) percent carbon, 9.3 (9.8, 9.2, 8.8) percent hydrogen and 50.8, 50.9 percent boron. These elemental analysis compare favorably with those calculated for the compound, benzyl decaborane $C_7H_{20}B_{10}$, which are 39.56 percent carbon 9.49 percent hydrogen and 50.93 percent boron.

*Example III*

As in Example I, this reaction was performed in a flask and a slow stream of nitrogen was maintained over the reactants in order to reduce air oxidation to a minimum.

10.4 grams (0.064 mole) of benzyl bromide was added rapidly to a solution of benzyl decaboranyl sodium prepared from 13 grams (0.064 mole) of benzyl decaborane prepared as described in the preceding examples and 2.92 grams (0.064 mole) of 50 weight percent dispersion of sodium hydride in mineral oil. Approximately 200 ml. of anhydrous diethyl ether were then added to the mixture as a solvent. After mixing, it was warmed in a 50° C. water bath for 4 hours and allowed to remain at room temperature (25° C.) for 8 days. Then the mixture was filtered through a sintered glass funnel to remove the sodium bromide formed. The filtrate was then concentrated at reduced pressure and the concentrate was extracted with normal pentane to recover dibenzyl decaborane. Upon removal of the normal pentane from the extract by vacuum, there was produced 0.5 gram of dibenzyl decaborane melting within the range from 111° C. to 116° C. Mass spectrophotometric analysis of the dibenzyl decaborane showed that it was a mixture of isomers.

The boron-containing solid materials, benzyl decaborane and dibenzyl decaborane, produced by practicing the method of this invention can be employed as ingredients of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing benzyl decaborane or dibenzyl decaborane, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant proper proportions of finely divided oxidizer and finely divided benzyl decaborane or dibenzyldecaborane can be admixed with a high solids content solution of a partially condensed urea-formaldehyde or phenol-formaldehyde resin, the proportions being such that the amount of the resin is about 5 to 10 percent by weight, based upon the weight of the oxidizer and benzyl decaborane or dibenzyldecaborane. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

What is claimed is:

1. A method for the preparation of a compound of the class $C_6H_5CH_2B_{10}H_{12}X$ which comprises reacting a benzyl halide and a compound of the class $B_{10}H_{12}(X)M$ at a temperature within the range from 25° C. to 100° C. while the reactants are in admixture with a solvent which is inert under thde reaction conditions, X being selected from the group consisting of hydrogen and benzyl and M being an alkali metal.

2. The method of claim 1 wherein said solvent is diethyl ether.

3. A method for the preparation of benzyl decaborane which comprises reacting benzyl bromide and decaboranyl sodium at a temperature within the range from 25° C. to 100° C. while the reactants are in admixture with a solvent which is inert under the reaction conditions.

4. The method of claim 3 wherein said solvent is diethyl ether.

5. A method for preparation of dibenzyl decaborane which comprises reacting benzyl bromide and benzyl decaboranyl sodium at a temperature within the range from 25° C. to 100° C. while the reactants are in admixture with a solvent which is inert under the reaction conditions.

6. The method of claim 5 wherein said solvent is diethyl ether.

7. Benzyl decaborane of the formula $C_6H_5CH_2B_{10}H_{13}$ having a melting point of about 63.5° C. to 64.5° C.

References Cited in the file of this patent

UNITED STATES PATENTS 2,558,559    Hurd et al. _____ June 26, 1951